(12) United States Patent
Penshorn et al.

(10) Patent No.: US 11,012,537 B2
(45) Date of Patent: May 18, 2021

(54) METHOD FOR HANDLING LONG-RUNNING CLIENT-SERVER PROCESSES

(71) Applicant: JPMorgan Chase Bank, N.A., New York, NY (US)

(72) Inventors: Jason Penshorn, Worthington, OH (US); Timothy Lorenz, Lewis Center, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/424,035

(22) Filed: May 28, 2019

(65) Prior Publication Data
US 2020/0382620 A1  Dec. 3, 2020

(51) Int. Cl.
*H04L 29/06* (2006.01)
*H04L 29/08* (2006.01)
*H04L 12/26* (2006.01)

(52) U.S. Cl.
CPC .............. *H04L 67/42* (2013.01); *H04L 67/02* (2013.01); *H04L 67/10* (2013.01); *H04L 43/16* (2013.01); *H04L 67/1014* (2013.01)

(58) Field of Classification Search
CPC ..... H04L 67/42; H04L 67/02; H04L 67/2833; H04L 61/30; H04L 43/045; H04L 67/10; H04L 67/1014; H04L 43/16; G06F 21/6218; G06F 9/547; G06F 9/5083
See application file for complete search history.

(56) References Cited

U.S. PATENT DOCUMENTS

| | | | |
|---|---|---|---|
| 2010/0011091 A1* | 1/2010 | Carver | H04L 61/30 709/219 |
| 2014/0032730 A1* | 1/2014 | Fall | H04L 67/2833 709/223 |
| 2016/0337426 A1* | 11/2016 | Shribman | H04L 65/608 |
| 2017/0063989 A1* | 3/2017 | Langouev | G06F 9/5083 |
| 2018/0262533 A1* | 9/2018 | McCaig | H04L 63/1441 |
| 2019/0052729 A1* | 2/2019 | Zhou | G06F 16/252 |
| 2019/0332451 A1* | 10/2019 | Tamjidi | G06F 21/6218 |

OTHER PUBLICATIONS

Rick Strahl, "Handling long Web Requests with Asynchronous Request Processing", WestWind Technologies, Apr. 9, 2001.*

* cited by examiner

*Primary Examiner* — Jungwon Chang
(74) *Attorney, Agent, or Firm* — Greenblum & Bernstein, P.L.C.

(57) ABSTRACT

Systems and methods for performing a process are provided. The methods include receiving, from a client, a request for an initiation of the process; transmitting, to a server, a request for executing the process; transmitting, to the client in response to the request, a first message that indicates that the process has been initiated; receiving, from the client, a request for a status of the process; transmitting, to the server, a query that relates to the status of an execution of the process; receiving a response to the query; and transmitting, to the client, a second message that indicates the status of the process.

18 Claims, 8 Drawing Sheets

METHOD FOR HANDLING LONG-RUNNING CLIENT-SERVER PROCESSES

BACKGROUND

1. Field of the Disclosure

This technology generally relates to methods and systems for conducting processes on a computer network, and more particularly to methods and systems for handling long-running processes between a client and a server in a network environment.

2. Background Information

Because Hypertext Transfer Protocol (HTTP) messaging is a request-reply protocol, messaging requires a client to wait for a response from a server before releasing a connection. If the time required for processing a request is relatively long, hardware resources on a client side and on a server side may become constrained, thereby limiting an ability to make efficient use of the corresponding components. In this aspect, web servers, such as Apache, limit the number of open connections that are supportable based on a number of available central processing unit (CPU) threads.

Further, in addition to resource constraint issues, a client may have a user interface component with which a user may wish to continue to interact. However, if the corresponding client-server remains in a waiting mode as a result of a previously submitted request for which a response has not yet been generated, the user interface may be effectively disabled.

Therefore, in view of the above, there is a need for a capability to handle long-running server-client processes in a manner that enables computing resources to remain available for other operations.

SUMMARY

The present disclosure, through one or more of its various aspects, embodiments, and/or specific features or sub-components, provides, inter alia, various systems, servers, devices, methods, media, programs, and platforms for handling long-running processes in a network environment. The various aspects, embodiments, features, and/or sub-components provide optimized processes of handling long-running client-server processes in a network environment.

According to an aspect of the present disclosure, a method for performing a process is provided. The method is implemented by a processor on a first server device. The method includes: receiving, from a client device, a request for an initiation of the process; transmitting, to a second server device, a request for executing the process; transmitting, to the client device in response to the request, a first message that indicates that the process has been initiated, the first message including information that indicates an identification of the process; receiving, from the client device, a request for a status of the process; transmitting, to the second server device, a query that relates to the status of an execution of the process; receiving, from the second server device, a response to the query; and transmitting, to the client device, a second message that indicates the status of the process.

The second message may include at least one of first information indicating that the process has not been completed, second information indicating that the process has been completed, and third information indicating that the process does not exist.

The method may be performed in accordance with a Hypertext Transfer Protocol (HTTP).

The receiving of the request for the initiation of the process may be a Representational State Transfer (REST) interaction.

The first information may include a "503 Service Unavailable" status code. The second information may include a "200 OK" status code. The third information may include a "404 Not Found" status code.

The first message may include a "202 Request Accepted" status code.

The first message may further include an instruction for an amount of time to be elapsed before the request for the status is to be generated.

The method may further include receiving, from the client device, a request for a cancellation of the process; and transmitting, to the client device, a third message that indicates that the process has been cancelled.

According to another aspect of the present disclosure, a method for performing a process is provided. The method is implemented by a processor on a first server device. The method includes receiving, from a client device, a request for an initiation of the process; transmitting, to a second server device, a request for executing the process; receiving, from the second server device, a first event that indicates a completion of a first portion of the process; transmitting, to the client device, the received first event; receiving, from the second server device, a last event that indicates a completion of an entirety of the process; and transmitting, to the client device, the received last event.

The method may further include sequentially receiving, from the second server device after the transmitting the received first event and before the receiving the last event, at least one additional event that indicates a completion of a respective portion of the process; and sequentially transmitting, to the client device, each of the received at least one additional event.

According to yet another aspect of the present disclosure, a computing device configured to implement an execution of a method for performing a process is provided. The computing device includes a display screen, a processor, a memory, and a communication interface coupled to each of the processor, the memory, and the display screen. The processor is configured to: receive from a client device, a request for an initiation of the process; transmit, to a server device, a request for executing the process; transmit, to the client device in response to the request, a first message that indicates that the process has been initiated, the first message including information that indicates an identification of the process; receive, from the client device, a request for a status of the process; transmit, to the server device, a query that relates to the status of an execution of the process; receive, from the server device, a response to the query; and transmit, to the client device, a second message that indicates the status of the process.

The second message may include at least one of first information indicating that the process has not been completed, second information indicating that the process has been completed, and third information indicating that the process does not exist.

The method may be performed in accordance with a Hypertext Transfer Protocol (HTTP).

The processor may be further configured to receive the request for the initiation of the process by receiving a Representational State Transfer (REST) interaction.

The first information may include a "503 Service Unavailable" status code. The second information may include a "200 OK" status code. The third information may include a "404 Not Found" status code.

The first message may include a "202 Request Accepted" status code.

The first message may further include an instruction for an amount of time to be elapsed before the request for the status is to be generated.

The processor may be further configured to receive, from the client device, a request for a cancellation of the process; and transmit, to the client device, a third message that indicates that the process has been cancelled.

According to still another aspect of the present disclosure, a computing device configured to implement an execution of a method for performing a process is provided. The computing device includes a display screen, a processor, a memory, and a communication interface coupled to each of the processor, the memory, and the display screen. The processor is configured to: receive, from a client device, a request for an initiation of the process; transmit, to a server device, a request for executing the process; receive, from the server device, a first event that indicates a completion of a first portion of the process; transmit, to the client device, the received first event; receive, from the server device, a last event that indicates a completion of an entirety of the process; and transmit, to the client device, the received last event.

The processor may further configured to sequentially receive, from the server device after the first event has been transmitted and before the last event has been received, at least one additional event that indicates a completion of a respective portion of the process; and sequentially transmit, to the client device, each of the received at least one additional event.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
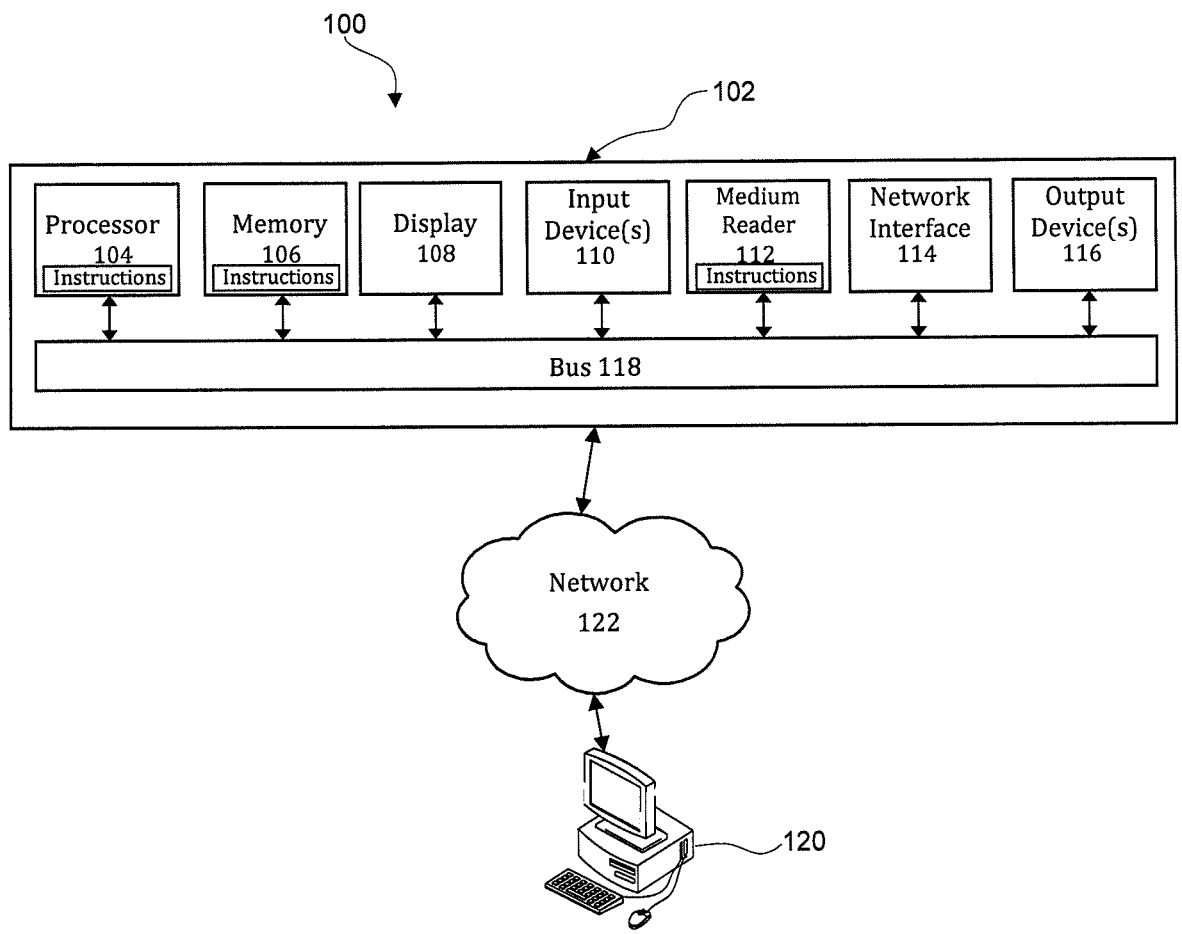
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of handling long-running processes between a client and a server in a network environment.

Figure 2:
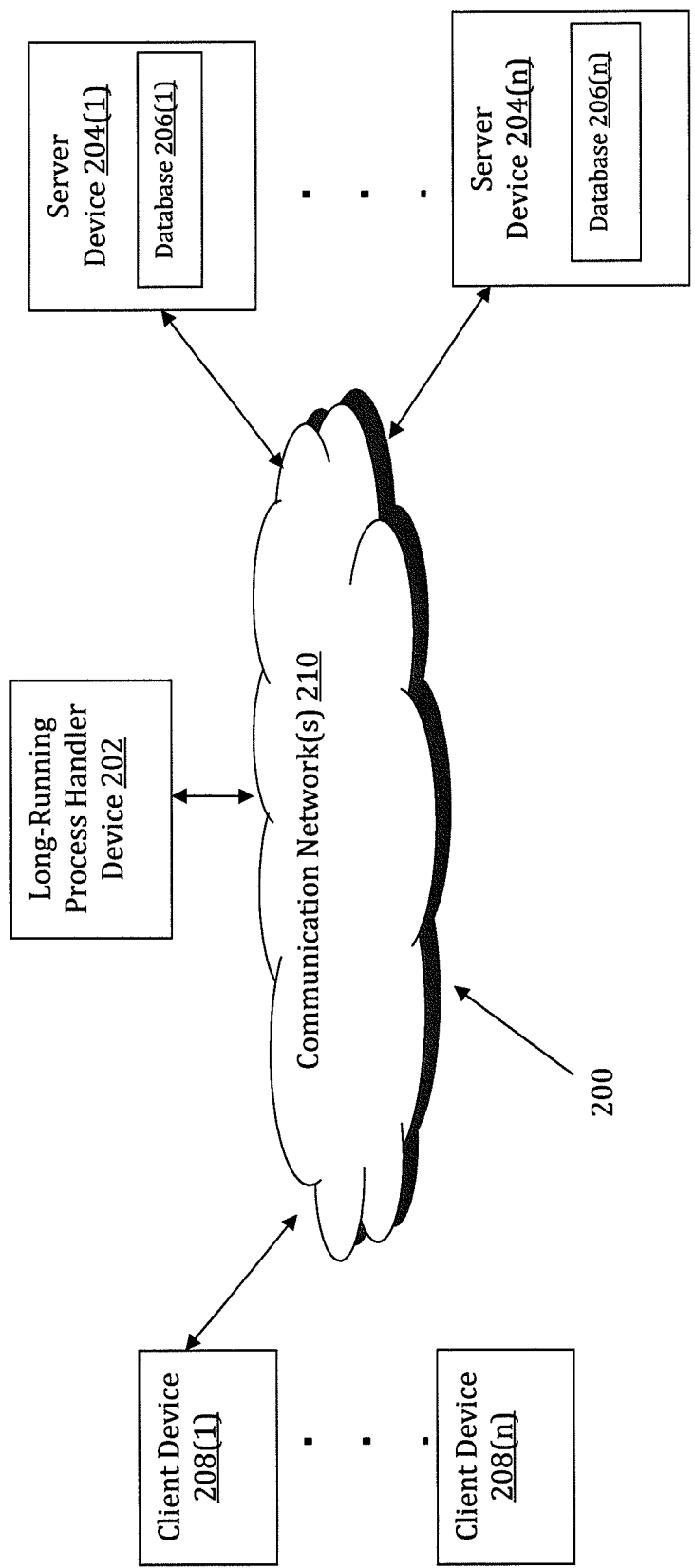
FIG. 2 illustrates an exemplary diagram of a network environment.

Referring to FIG. 2, a schematic of an exemplary network environment 200 for implementing a method for handling long-running processes between a client and a server in a network environment is illustrated. In an exemplary embodiment, the method is executable on any networked computer platform, such as, for example, a wireless mobile communication device, i.e., a smart phone.

The method for handling long-running processes between a client and a server in a network environment may be implemented by a Long-Running Process Handler (LRPH) device 202. The LRPH device 202 may be the same or similar to the computer system 102 as described with respect to FIG. 1. The LRPH device 202 may store one or more applications that can include executable instructions that, when executed by the LRPH device 202, cause the LRPH device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the LRPH device 202 itself, may be located in virtual server(s) running in a cloud-based computing environment rather than being tied to one or more specific physical network computing devices. Also, the application(s) may be running in one or more virtual machines (VMs) executing on the LRPH device 202. Additionally, in one or more embodiments of this technology, virtual machine(s) running on the LRPH device 202 may be managed or supervised by a hypervisor.

In the network environment 200 of FIG. 2, the LRPH device 202 is coupled to a plurality of server devices 204(1)-204(n) that hosts a plurality of databases 206(1)-206(n), and also to a plurality of client devices 208(1)-208(n) via communication network(s) 210. A communication interface of the LRPH device 202, such as the network interface 114 of the computer system 102 of FIG. 1, operatively couples and communicates between the LRPH device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the LRPH device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and LRPH devices that efficiently manage large numbers of services in a hybrid cloud environment.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The LRPH device 202 may be a standalone device or integrated with one or more other devices or apparatuses, such as one or more of the server devices 204(1)-204(n), for example. In one particular example, the LRPH device 202 may include or be hosted by one of the server devices 204(1)-204(n), and other arrangements are also possible. Moreover, one or more of the devices of the LRPH device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the LRPH device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store client-specific data and any other data that relates to handling of long-running client-server processes on a network.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can facilitate the execution of a web application. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the LRPH device 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the LRPH device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the LRPH device 202, the server devices 204(1)-204(n), or the client devices 208(1)-208(n), for example, may be configured to operate as virtual instances on the same physical machine. In other words, one or more of the LRPH device 202, the server devices 204(1)-204(n), or the client devices 208(1)-208(n) may operate on the same physical device rather than as separate devices communicating through communication network(s) 210. Additionally, there may be more or fewer LRPH devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
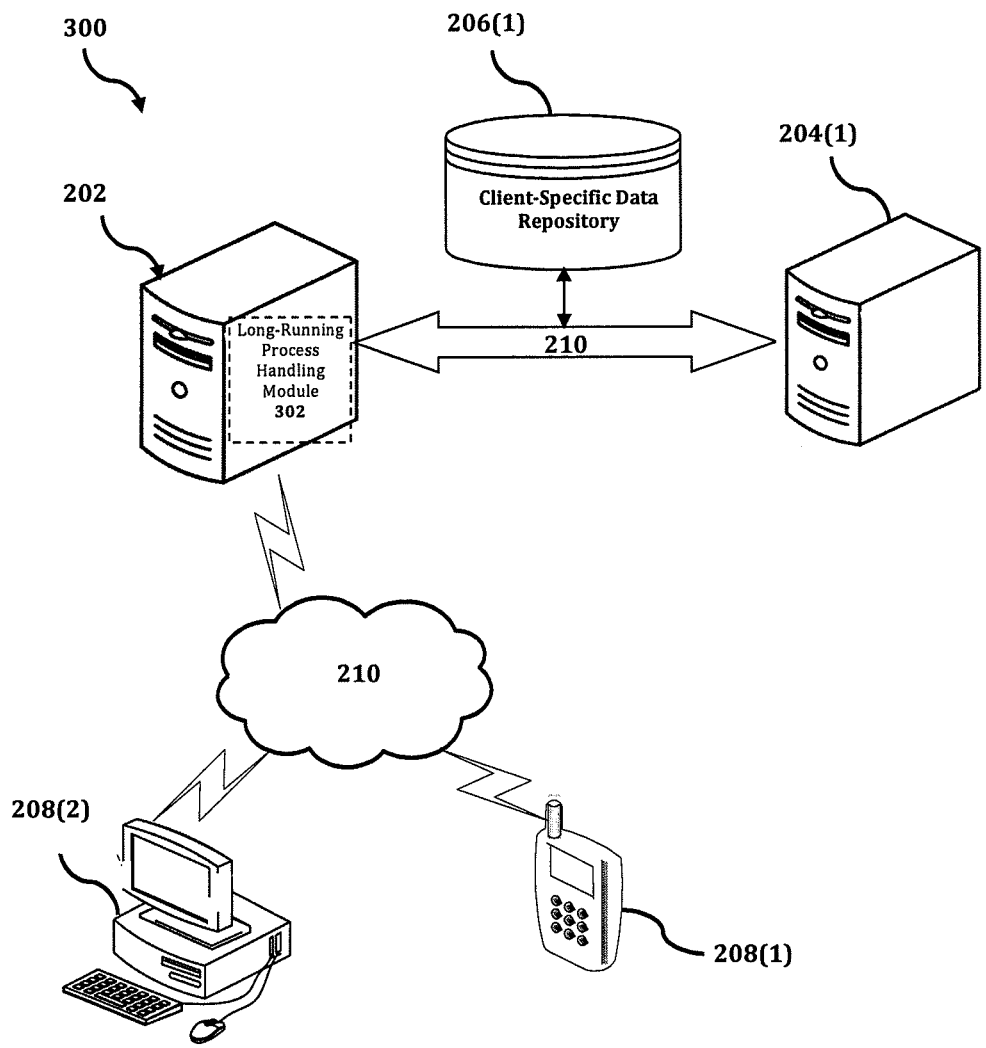
FIG. 3 shows an exemplary system for handling long-running processes between a client and a server in a network environment.

The LRPH device 202 is described and shown in FIG. 3 as including a long-running process handling module 302, although it may include other modules, databases, or applications, for example. As will be described below, the long-running process handling module 302 is configured to process large numbers of client-server transactions and processes in order to manage the handling of the transactions and processes in an automated, efficient, scalable, and reliable manner.

An exemplary process 300 for handling long-running client-server processes by utilizing the network environment of FIG. 2 is shown as being executed in FIG. 3. Specifically, a first client device 208(1) and a second client device 208(2) are illustrated as being in communication with LRPH device 202. In this regard, the first client device 208(1) and the second client device 208(2) may be "clients" of the LRPH device 202 and are described herein as such. Nevertheless, it is to be known and understood that the first client device 208(1) and/or the second client device 208(2) need not necessarily be "clients" of the LRPH device 202, or any entity described in association therewith herein. Any additional or alternative relationship may exist between either or both of the first client device 208(1) and the second client device 208(2) and the LRPH device 202, or no relationship may exist.

Further, LRPH device 202 is illustrated as being able to access a client-specific data repository 206(1). The long-running process handling module 302 may be configured to access this database for implementing a method for handling long-running client-server processes in a network environment.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the LRPH device 202 via broadband or cellular communication. Of course, these embodiments are merely exemplary and are not limiting or exhaustive.

Upon being started, the long-running process handling module 302 executes a method for handling long-running client-server processes in a network environment. An exemplary first process for handling long-running client server processes in a network environment is generally indicated at flowchart 400 in FIG. 4.

Figure 4:
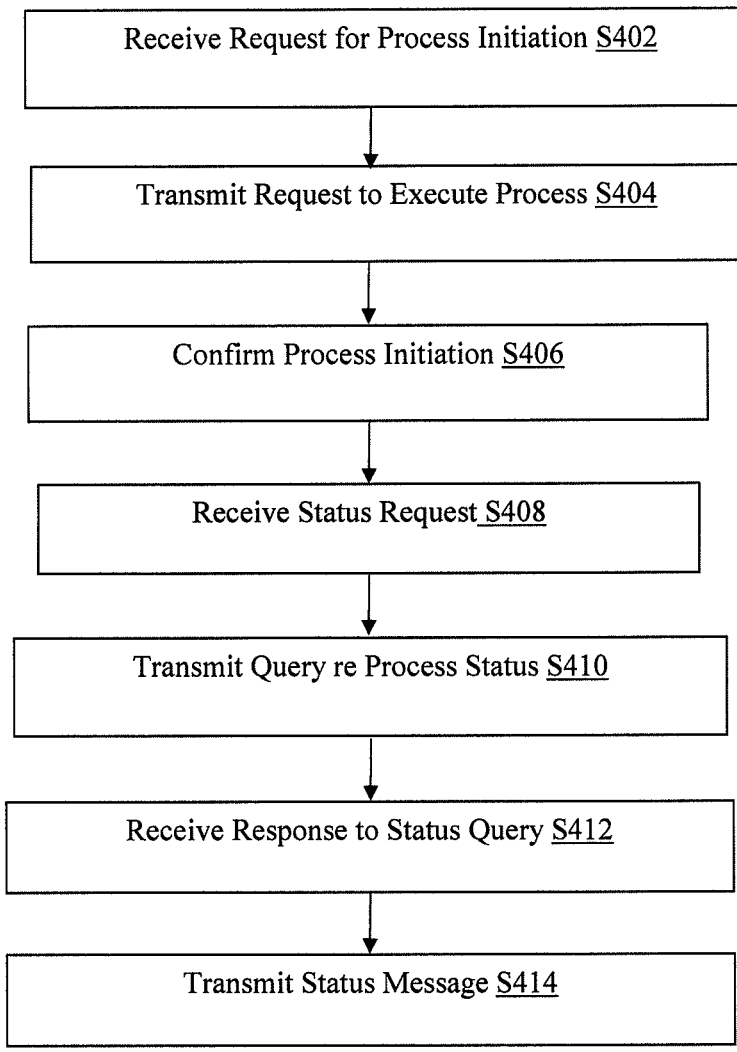
FIG. 4 is a flowchart of an exemplary first method for handling long-running processes between a client and a server in a network environment, according to an exemplary embodiment.

In the process 400 of FIG. 4, at step S402, the LRPH device 202 receives a request for an initiation of a client-server process from a client device 208. In an exemplary embodiment, the client-server process is to be performed in accordance with HyperText Transfer Protocol (HTTP), and the interactions between the LRPH device 202 and the client device 208 are Representational State Transfer (REST) interactions. For example, a user of the client device 208 may wish to obtain a year-end credit card statement for a user account, and may therefore request an initiation of a process for obtaining the year-end credit card statement.

At step S404, the LRPH device 202 identifies a server device 204 that is configured to execute the requested client-server process, and transmits a request for executing the client-server process to the server device 204. In an exemplary embodiment, the request for executing the client-server process may be transmitted via an Apache Kafka software platform.

At step S406, the LRPH device 202 transmits a confirmation message to the client device 208 in order to confirm that the request for initiating the client-server process has been accepted and that the client-server process has been initiated. In an exemplary embodiment, the confirmation message may include a "202 Request Accepted" status code, in accordance with HTTP standards. In an exemplary embodiment, the confirmation message may also include an instruction that the client should wait for a predetermined amount of time, such as, for example, "x seconds", before transmitting a request for a status of the client-server process. Alternatively, such an instruction may be transmitted to the client device 208 as a stand-alone message at any other time point with the process 400.

At step S408, the LRPH device 202 receives a status request from the client device 208. At step S410, the LRPH device 202 transmits a query regarding the requested status to the server device 204 that is executing the client-server process.

The server device 204 generates and transmits a response to the query that is based on the status of the client-server process, and at step S412, the LRPH device 202 receives the response to the status query. In an exemplary embodiment, the response to the query may include any of the following: first information that indicates that the process is ongoing but has not been completed; second information that indicates that the process has been completed; and third information that indicates that the process does not exist.

At step S414, the LRPH device 202 transmits a status message to the client device 208, as a response to the status request received in step S408. In an exemplary embodiment, in accordance with HTTP standards, when the query response includes the first information, the status message that is transmitted to the client device 208 includes a "503 Service Unavailable" status code. In an exemplary embodiment, when the query response includes the second information, the status message that is transmitted to the client device 208 includes a "200 OK" status code. In an exemplary embodiment, when the query response includes the third information, the status message that is transmitted to the client device 208 includes a "404 Not Found" status code.

In an exemplary embodiment, in the event that a user of the client device 208 wishes to cancel the client-server process during an execution thereof, the LRPH device 202 may receive a request to cancel the process. In response to a process cancellation request, the LRPH device 202 may transmit a message indicating that the client-server process has been cancelled. In an exemplary embodiment, the cancellation message may include a "200 OK" status code indicating an acceptance of and a completion of the requested cancellation.

Figure 5:
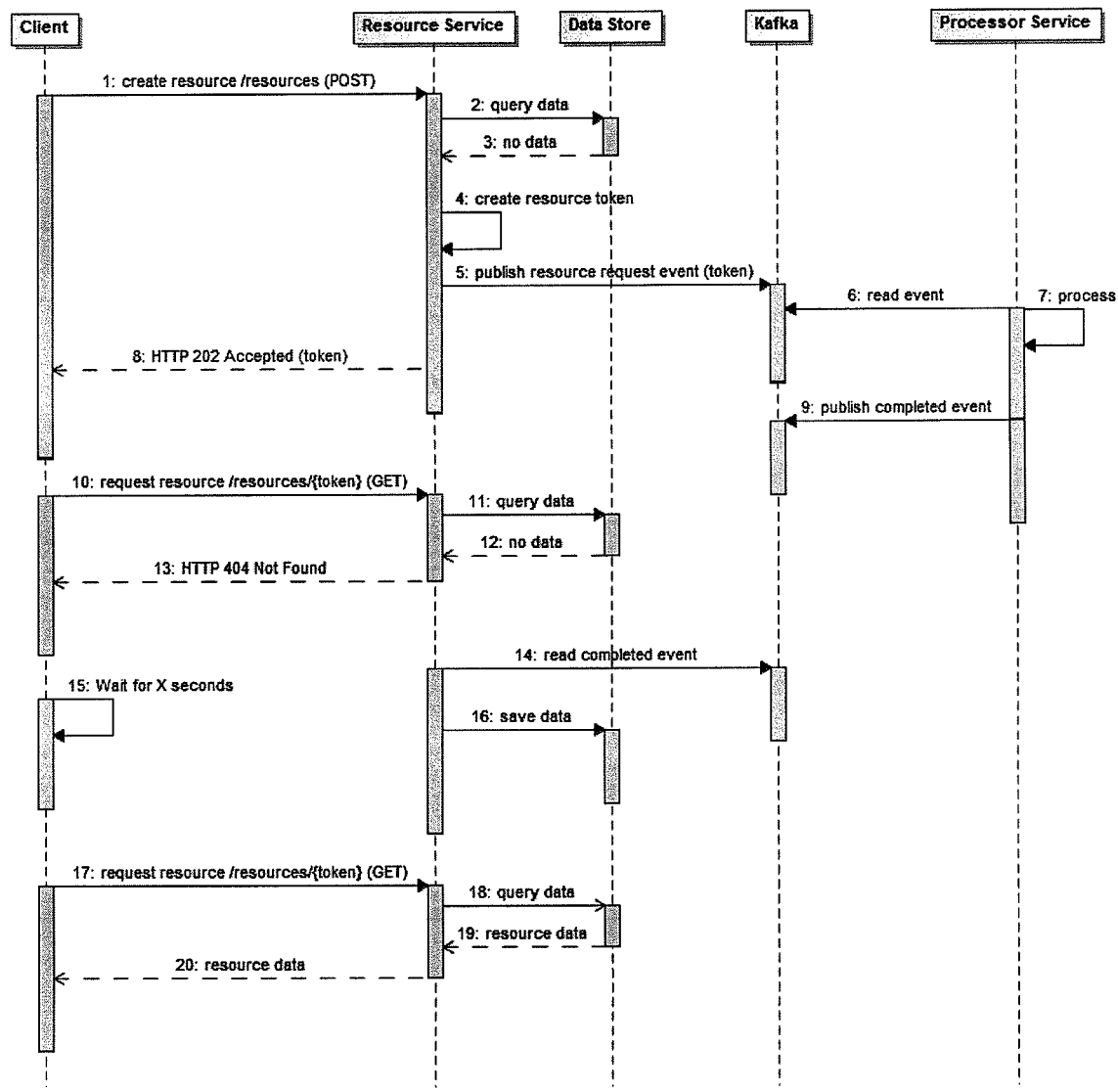
FIG. 5 is a data flow diagram of the exemplary first method for handling long-running processes between a client and a server in a network environment.

Referring to FIG. 5, a data flow diagram 500 of the exemplary first method of FIG. 4 for handling long-running processes between a client and a server in a network environment and in accordance with REST standards is illustrated. First, a client transmits a request to initiate a client-server process by using a POST method. This request is received by LRPH device 202, which acts as a resource service, and is shown in FIG. 5 as "Resource Service". The resource service then checks the client-specific data repository 206(1) to determine whether the data that would be generated by the requested client-server process already exists in the database by sending a query therefor to the client-specific data repository 206(1), which is shown in FIG. 5 as "Data Store". If the relevant data does not already exist, then the resource service generates a resource token that acts as a request to execute the requested client-server process. The resource service also transmits a message that includes a "202 Request Accepted" status code to the client.

Then, the resource service publishes the generated resource token, thereby effectively transmitting the request to execute the requested client-server process to the server device 204 (shown in FIG. 5 as "Processor Service") via the Apache Kafka software platform (shown in FIG. 5 as "Kafka"). The processor service transmits a read event to Kafka, thereby acknowledging the request to execute the client-server process, and then commences the execution of the client-server process.

The client device 202 may transmit a status request regarding the status of the client-server process to the resource service, for example, by using a GET method. If such a status request is received while the execution of the client-server process is ongoing but not completed, the resource service may respond to the status request by transmitting a message that includes a "503 Service Unavailable" status code. The message may also include an instruction to wait for a predetermined amount of time prior to transmitting another status request, such as, for example, a "Retry—After: X" message, where X indicates an amount of time or a date.

When the execution of the client-server process has been completed, the resource service may determine that the execution has been completed by reading a completed event via the Apache Kafka software platform. The resource service may then store the relevant data in the data store. Then, when the resource service receives a status request from the client, the resource service may query the data store in order to retrieve the relevant data, and my then transmit the data to the client, thereby effectively responding to the status request by indicating that the requested client-server process has been completed and providing the result thereof to the client.

Figure 6:
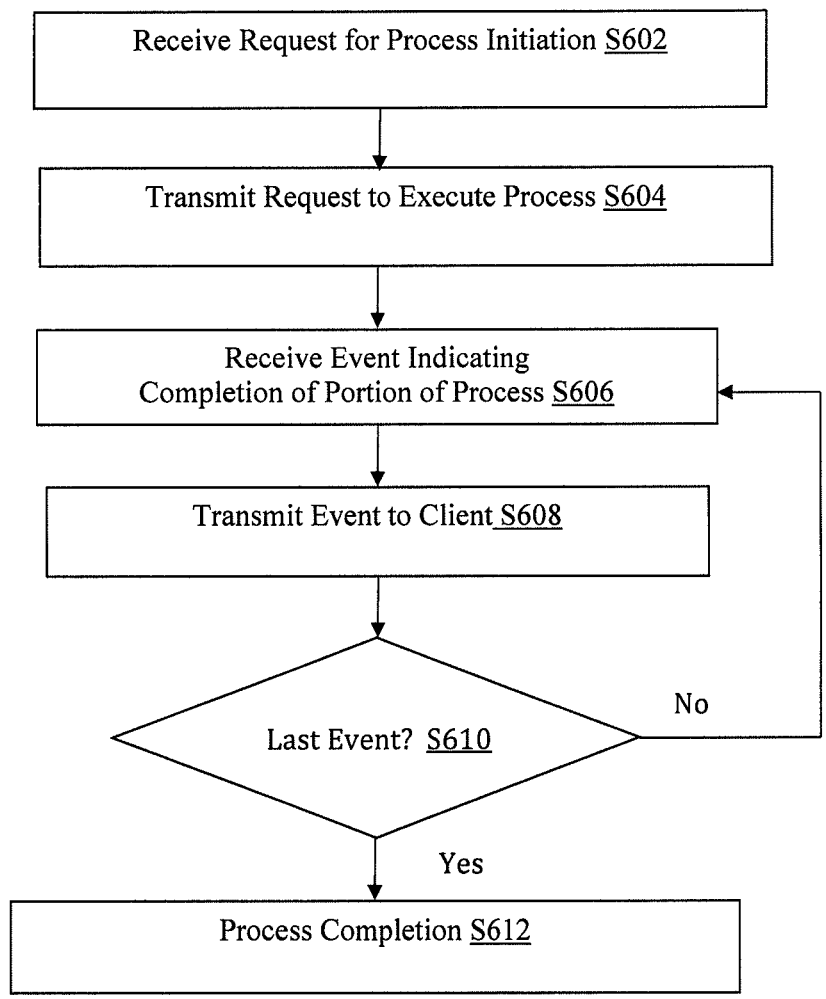
FIG. 6 is a flowchart of an exemplary second method for handling long-running processes between a client and a server in a network environment, according to another exemplary embodiment.

An exemplary second process for handling long-running client server processes in a network environment is generally indicated at flowchart 600 in FIG. 6.

In the process 600 of FIG. 6, at step S602, the LRPH device 202 receives a request for an initiation of a client-server process from a client device 208. In an exemplary embodiment, the client-server process is to be performed in accordance with HyperText Transfer Protocol (HTTP), and the interactions between the LRPH device 202 and the client device 208 are Representational State Transfer (REST) interactions. For example, a user of the client device 208 may wish to obtain a year-end credit card statement for a user account, and may therefore request an initiation of a process for obtaining the year-end credit card statement.

At step S604, the LRPH device 202 identifies a server device 204 that is configured to execute the requested client-server process, and transmits a request for executing the client-server process to the server device 204. In an exemplary embodiment, the request for executing the client-server process may be transmitted via the Apache Kafka software platform.

At step S606, the LRPH device 202 receives an event that indicates a completion of a portion of the requested client-server process from the server device 204, and at step S608, the LRPH device 202 transmits the received event to the client device 208. In this aspect, the transmission of the received event acts as a status update, thereby enabling the client device 208 to be aware of the status without a need to transmit a status request.

At step S610, the LRPH device 202 determines whether the most recently received event is the last event for the requested client-server process. When the last event has been received, the process 600 is completed at step S612. When the most recently received event is not the last event, then the process 600 cycles back to step S606, at which a next event is received, thereby indicating a completion of a subsequent portion of the client-server process.

Figure 7:
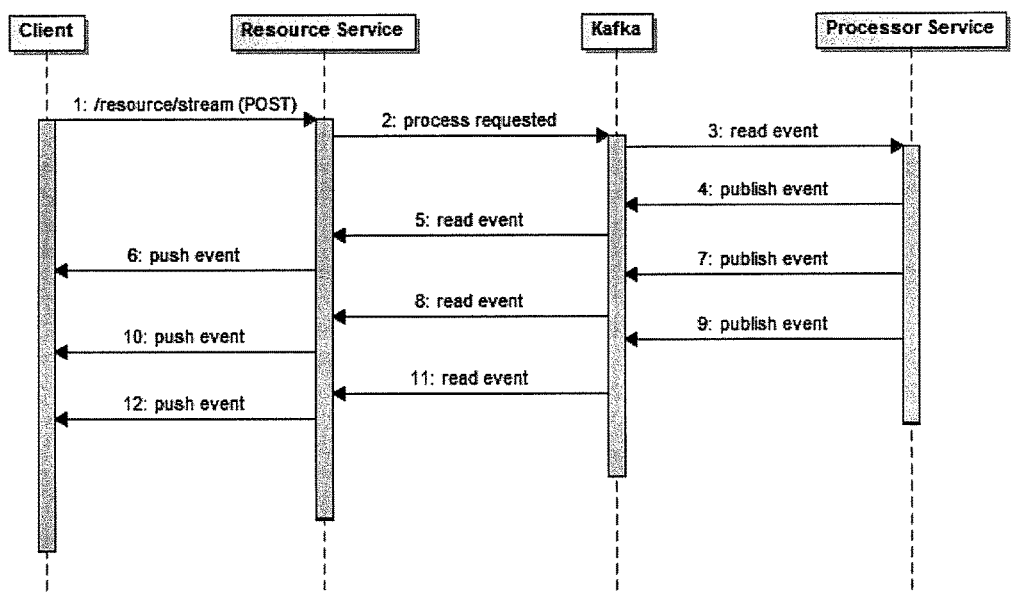
FIG. 7 is a data flow diagram of the exemplary second method for handling long-running processes between a client and a server in a network environment.

Referring to FIG. 7, a data flow diagram of the exemplary second method of FIG. 6 for handling long-running processes between a client and a server in a network environment is illustrated. First, a client transmits a request to initiate a client-server process by using a POST method. This request is received by LRPH device 202, which acts as a resource service, and is shown in FIG. 7 as "Resource Service". The resource service then transmits a request to execute the requested client-server process to the server device 204 (shown in FIG. 7 as "Processor Service") via the Apache Kafka software platform (shown in FIG. 7 as "Kafka"). The processor service then commences the execution of the client-server process.

When a portion of the requested client-server process has been completed, the processor service publishes an event to Kafka, and Kafka then reads the event to the resource service. The resource service then pushes the event to the client, thereby effectively notifying the client of the status of the client-server process. Then, when a subsequent portion of the client-server process has been completed, the same sequence of events occurs. This sequence repeats until the entire client-server process is completed, or until a request to cancel the client-server process is transmitted by the client.

Figure 8:
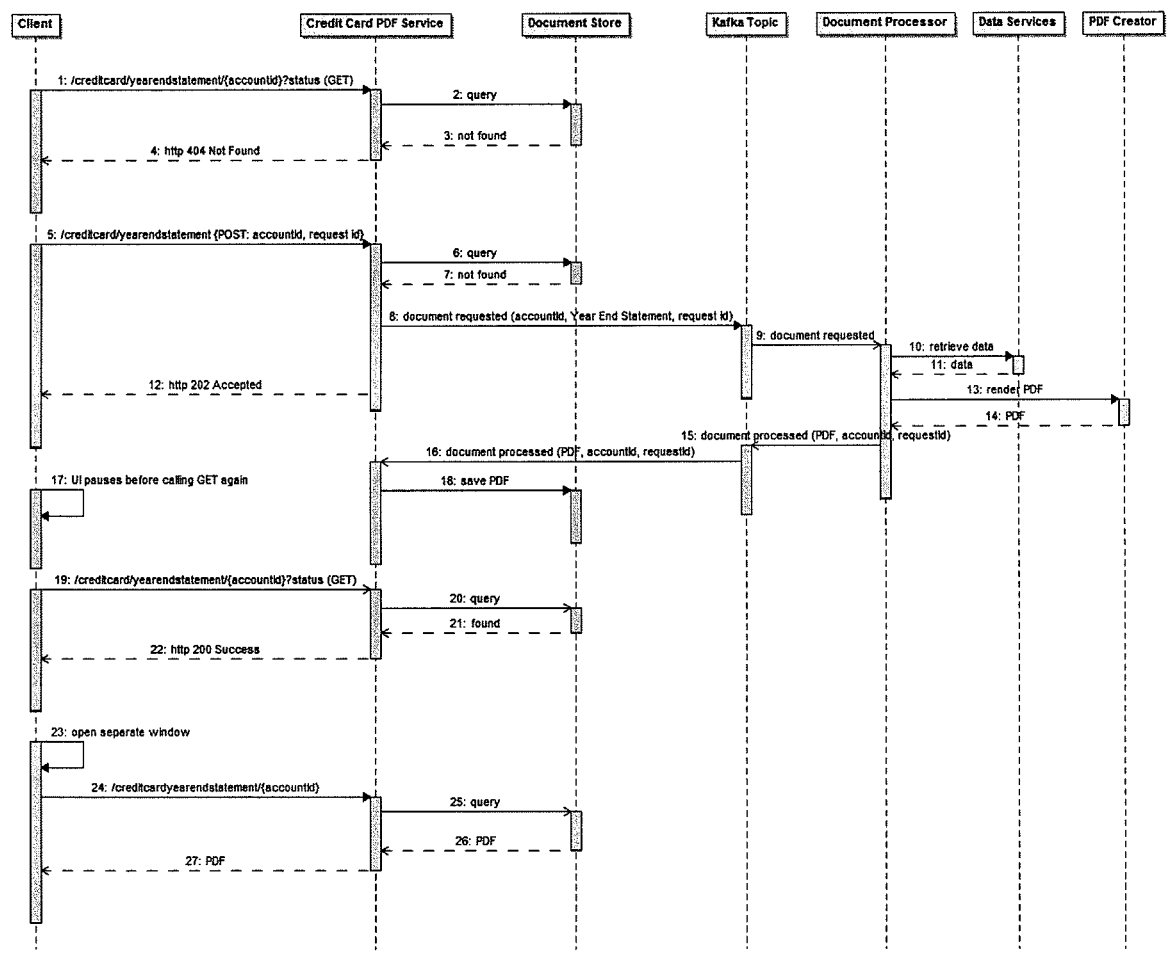
FIG. 8 is a data flow diagram of a handling of a credit card year end statement production process, in accordance an exemplary embodiment.

FIG. 8 is a data flow diagram of a handling of a credit card year-end statement production process, in accordance with an exemplary embodiment. As illustrated in FIG. 8, a client transmits a request for a credit card year-end statement to a credit card PDF service by using a GET method. The credit card PDF service checks whether the statement already exists by transmitting a query to a document store. If the statement does not already exist, the credit card PDF service informs the client that the statement does not exist by transmitting a response that includes a "404 Not Found" status code.

The client then transmits a request to initiate a client-server transactional process for obtaining a credit card year-end statement by using a POST method. The credit card PDF service transmits a request to execute the process for obtaining the credit card year-end statement to a document processor via the Apache Kafka software platform, and then transmits a response to the client request that includes a "202 Accepted" status code, thereby indicating that requested client-server transactional process has been initiated.

The document processor executes the client-server transactional process by first retrieving the client credit card data from data services, and then transmitting this data to a PDF creator in order to request that a PDF document be rendered. When the requested document is generated, the PDF creator send the document to the document processor, which then transmits the document to the credit card PDF service via the Kafka software platform The credit card PDF service then saves the PDF document in the document store.

When the client subsequently transmits a status request to the credit card PDF service by using a GET method, the credit card PDF service again queries the document store.

Then, because the document has now been saved, the credit card PDF service receives a message indicating that the document has been found. The credit card PDF service informs the client by transmitting a response to the status request that includes a "200 OK" status code. The PDF document is then transmitted from the document store to the credit card PDF service, and then relayed to the client.

Accordingly, with this technology, an optimized process for handling long-running client-server processes in a network environment is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for performing a process, the method being implemented by a processor on a first server device, the method comprising:
   receiving, from a client device, a request for an initiation of the process;
   transmitting, to a second server device, a request for executing the process;
   transmitting, to the client device in response to the request, a first message that indicates that the process has been initiated, the first message including information that indicates an identification of the process;
   receiving, from the client device after the first message has been transmitted to the client device, a request for a status of the process;
   transmitting, to the second server device, a query that relates to the status of an execution of the process;
   receiving, from the second server device, a response to the query; and
   transmitting, to the client device, a second message that indicates the status of the process,
   wherein the first message further includes an instruction for an amount of time to be elapsed before the request for the status is to be generated.

2. The method of claim 1, wherein the second message includes at least one of first information indicating that the process has not been completed, second information indicating that the process has been completed, and third information indicating that the process does not exist.

3. The method of claim 2, wherein the method is performed in accordance with a Hypertext Transfer Protocol (HTTP).

4. The method of claim 3, wherein the receiving of the request for the initiation of the process is a Representational State Transfer (REST) interaction.

5. The method of claim 4, wherein the first information includes a "503 Service Unavailable" status code, the second information includes a "200 OK" status code, and the third information includes a "404 Not Found" status code.

6. The method of claim 4, wherein the first message includes a "202 Request Accepted" status code.

7. The method of claim 1, further comprising:
   receiving, from the client device, a request for a cancellation of the process; and
   transmitting, to the client device, a third message that indicates that the process has been cancelled.

8. A method for performing a process, the method being implemented by a processor on a first server device, the method comprising:
   receiving, from a client device, a request for an initiation of the process;
   transmitting, to a second server device, a request for executing the process;
   transmitting, to the client device in response to the request, a first message that indicates that the process has been initiated, the first message including information that indicates an identification of the process and a "202 Request Accepted" status code;
   receiving, from the second server device, a first event that indicates a completion of a first portion of the process;
   transmitting, to the client device, the received first event;
   receiving, from the second server device after the first event has been transmitted to the client device, a last event that indicates a completion of an entirety of the process; and
   transmitting, to the client device, the received last event.

9. The method of claim 8, further comprising:
   sequentially receiving, from the second server device after the transmitting the received first event and before the receiving the last event, at least one additional event that indicates a completion of a respective portion of the process; and sequentially transmitting, to the client device, each of the received at least one additional event.

10. A computing device configured to implement an execution of a method for performing a process, the computing device comprising:
   a display screen;
   a processor;
   a memory; and
   a communication interface coupled to each of the processor, the memory, and the display screen,
   wherein the processor is configured to:
      receive, from a client device, a request for an initiation of the process;
      transmit, to a server device, a request for executing the process;
      transmit, to the client device in response to the request, a first message that indicates that the process has been initiated, the first message including information that indicates an identification of the process;
      receive, from the client device after the first message has been transmitted to the client device, a request for a status of the process;
      transmit, to the server device, a query that relates to the status of an execution of the process;
      receive, from the server device, a response to the query; and
      transmit, to the client device, a second message that indicates the status of the process,
   wherein the first message further includes an instruction for an amount of time to be elapsed before the request for the status is to be generated.

11. The computing device of claim 10, wherein the second message includes at least one of first information indicating that the process has not been completed, second information indicating that the process has been completed, and third information indicating that the process does not exist.

12. The computing device of claim 11, wherein the method is performed in accordance with a Hypertext Transfer Protocol (HTTP).

13. The computing device of claim 12, wherein the processor is further configured to receive the request for the initiation of the process by receiving a Representational State Transfer (REST) interaction.

14. The computing device of claim 13, wherein the first information includes a "503 Service Unavailable" status code, the second information includes a "200 OK" status code, and the third information includes a "404 Not Found" status code.

15. The computing device of claim 13, wherein the first message includes a "202 Request Accepted" status code.

16. The computing device of claim 10, wherein the processor is further configured to:
   receive, from the client device, a request for a cancellation of the process; and
   transmit, to the client device, a third message that indicates that the process has been cancelled.

17. A computing device configured to implement an execution of a method for performing a process, the computing device comprising:
   a display screen;
   a processor;
   a memory; and
   a communication interface coupled to each of the processor, the memory, and the display screen,
   wherein the processor is configured to:
      receive, from a client device, a request for an initiation of the process;
      transmit, to a server device, a request for executing the process;
      transmit, to the client device in response to the request, a first message that indicates that the process has been initiated, the first message including information that indicates an identification of the process and a "202 Request Accepted" status code;
      receive, from the server device, a first event that indicates a completion of a first portion of the process;
      transmit, to the client device, the received first event;
      receive, from the server device after the first event has been transmitted to the client device, a last event that indicates a completion of an entirety of the process; and
      transmit, to the client device, the received last event.

18. The computing device of claim 17, wherein the processor is further configured to:
   sequentially receive, from the server device after the first event has been transmitted and before the last event has been received, at least one additional event that indicates a completion of a respective portion of the process; and
   sequentially transmit, to the client device, each of the received at least one additional event.

* * * * *